United States Patent [19]

Spindler

[11] Patent Number: 4,502,243
[45] Date of Patent: Mar. 5, 1985

[54] INSECT HAMMER

[75] Inventor: Carl A. Spindler, 31943 W. 13 Mile Rd., Farmington Hills, Mich. 48018

[73] Assignee: Carl Spindler

[21] Appl. No.: 459,810

[22] Filed: Mar. 17, 1983

[51] Int. Cl.³ .............................................. A01M 3/02
[52] U.S. Cl. ...................................................... 43/137
[58] Field of Search ................ 43/107, 110, 111, 134, 43/137; 15/160, 186, 187, 188; 128/62 R

[56] References Cited

U.S. PATENT DOCUMENTS

| | | | |
|---|---|---|---|
| 926,303 | 6/1909 | Thompson | 128/62 R |
| 984,332 | 2/1911 | Whitehead | 43/137 |
| 1,793,307 | 2/1931 | Dolan | 15/188 |
| 2,891,347 | 6/1959 | Swint | 43/137 |
| 3,314,096 | 4/1967 | Berliner | 15/187 |
| 3,673,730 | 7/1972 | Hegenberger | 43/137 |
| 3,798,828 | 3/1974 | Walti et al. | 43/137 |
| 3,905,146 | 9/1975 | Ralston | 43/137 |
| 3,984,937 | 10/1976 | Hamilton | 43/137 |

Primary Examiner—Nicholas P. Godici
Assistant Examiner—M. Jordan
Attorney, Agent, or Firm—Carl A. Spindler

[57] ABSTRACT

A device used for eliminating or holding insects without smashing them. It consists of a plastic handle and a plastic spherical type head with flexible, but firm plastic rounded tip projections. Rounded head improves removal of insects or webbs from curtains, corners, and surfaces easily, due to quick omnidirectional striking surface.

1 Claim, 6 Drawing Figures

INSECT HAMMER

References cited: United States Patent
U.S. Pat. No. 3,673,730, 7/1972, Hegenberger . . . 43/137
U.S. Pat. No. 3,905,146, 9/1975, Ralston . . . 43/137
U.S. Pat. No. 3,798,828, 3/1974, Walti . . . 43/137

SUMMARY OF THE INVENTION

This device relates generally to the fly swatter and more particularly that class of devices used for destruction or lifting of insects from surfaces.

In general, the improved fly swatter or Insect Hammer comprises an insect killing and holding device, having a plastic rounded spherical type head, with projections, to which a handle is attached. An omindirectional plastic material is formed by a pattern of tapered rounded tip projections of suitable length and spacing to impale or trap insects on contact.

As one aspect of the present invention, it is a primary object of the invention to provide an effective means of eliminating many common household insects, such as spiders, moths, flies, crickets, and other bugs.

As another aspect of the present invention, the Insect Hammer will provide a killing device that will also pick insects from surfaces without squashing, thus eliminating stains and messy clean-ups of surfaces.

As another aspect of the present invention, due to the plastic material used in the composition of the striking head, and the rounded tip projections on the head it can be utilized on all furniture, curtains, walls, ceilings and other surfaces without worry of scratching, tearing, or maring the surfaces.

As another aspect of the present invention, the novel striking surface having a spherical head can be utilized quickly and more effectively, due to the omnidirectional projections which can reach into corners, folds in curtains, and other tight places. Also, by twisting the head of the Insect Hammer various insect webbs or nests can be twirled away.

Still another aspect of the present invention is to provide a device that releases insects by striking handle against waist container or by rinsing captured insect down the sink. This eliminates touching of insects.

It is therefore an object of the present invention to provide an improved insect removal device that can be inexpensively fabricated at high rates of production by injection molding or other suitable means and by use of die mold halves which fit together on a molded plastic handle.

Further objects and advantages of the present invention will be apparent from the following description, reference being had to the accompanying drawings wherein a preferred form of embodiment of the invention is clearly shown.

DESCRIPTION OF THE PREFERRED EMBODIMENT

Figure 3C:
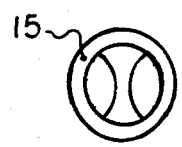
FIG. 3C shows a top views of the cap, used to hang the Insect Hammer and located at the end of the handle.
Figure 3A:
FIG. 3A is a front view of the cap.
Figure 3B:
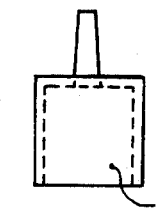
FIG. 3B is a side view of the cap.
Figure 2:
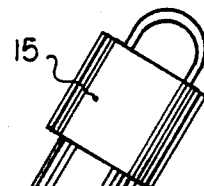
FIG. 2 magnifies and shows an angle on the individual projection.
Figure 2:
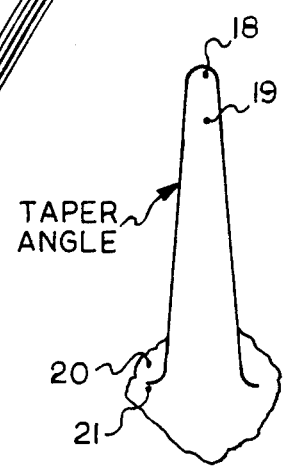
Figure 1:
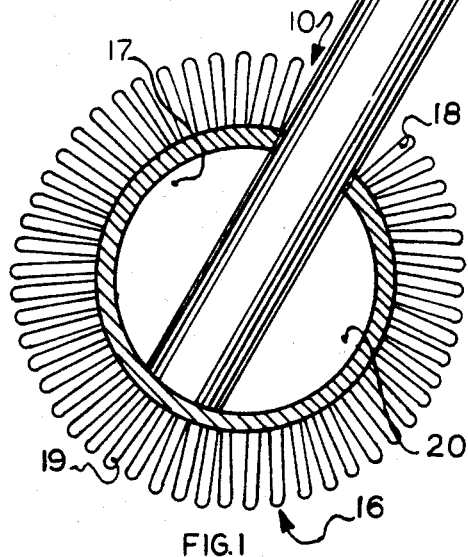
FIG. 1 is a cross sectional head view of the Insect Hammer constructed in accordance with the present invention; and showing the handle as an integral part of the base portion.
Figure 4:
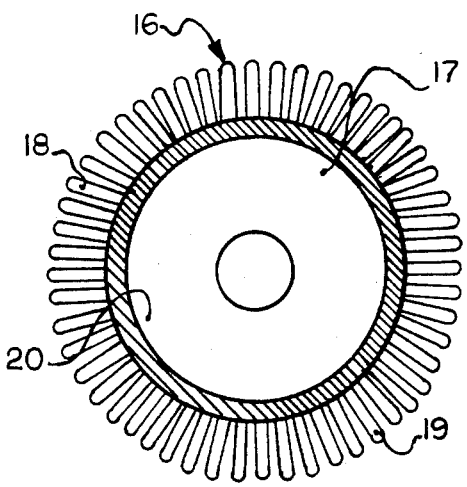
FIG. 4 is a sectional view of the head from the bottom or from where handle is inserted into head.

Referring now to the drawings, the Insect Hammer, indicated in its entirety as 10, comprises a head 12, a handle 14 extending from base of head, integral with, and in the same plane as shown, and a cap 15 at the end of handle.

A lifting surface 16, is formed on the spherical head 17 by the ends 18 of flexible yet firm projections 19, all of which are progressively slightly tapered, equal in length and preferably of substantially the same configuration (shown as tapered straight) and integral with a relatively thin base 20 which is of suitable firm, resilient material, so as to hold flexible projections when striking a resisting surface during a swatting type operation.

Each projection 19 is strenghened by a radius buildup of material, as shown at 21, at its point of contact with the base 20. Projections 19 are spaced evenly yet randomly to completely cover entire head so as to produce an omnidirectional lifting surface.

As shown in the drawings, the device shall have the overall dimensions and flexibility suitable for the intended purpose. The handle can be injection molded from a plastic, in one piece with the head, or can be a separate unit of hard plastic and assembled to the head 17. Also, while the projections are shown in a symmetrical pattern, and are of straight tapered cross-sections, the projections need not be arranged symmetrically and other cross-sectional shapes or lengths may be used. The importance is that they be of uniform length and of such a density that when the invention is used to lift an insect, such insect will become lodged or impaled on or between one or more of the projections. The combination of the projections shape, cross-sectional area, length, and spacing between the projections are such that the insect will be easily released by tapping the handle of device against an edge such as a waste container, sink or other resisting surface.

As an example of a suitable Insect Hammer device which will perform effectively the object set forth above, projections are made 0.065 inch round tapered and of a length of 0.350 inch to 0.375 inch. The density of the projection is 25 to 50 per square inch.

It is to be understood that the invention in its preferred form is injection molded of a suitable plastic such as polyethelyene so that it may be easily reproduced and has the above configuration with the handle, either integral or made seperately, and affixed to the head in any suitable manner. Additionally, the mold draft angles on the projection become a useful function in the removal of the insect from the projection formed surface. If polyehylene is not desired, polyprophylene or high impact (vinyl modified) polystyrene may be used.

What is claimed is:

1. An insect hammer device comprising: a head having a hollow base and means to impale, kill, and trap an insect; with a handle connected to said head; said base being of relatively thin firm material in a spherical configuration and supporting said means, said means comprising projections; said projections tapering radially from the base towards a rounded end of each projection, and each projection being of equal length and spacing from every other projection to thereby form a lifting surface to impale, kill, and trap an insect by forcing the insect past said rounded tips into a wedged position between said projections; and all of said projections having substantially the same configuration to permit easy removal of the trapped insect by tapping the handle against an object.

* * * * *